（12）United States Patent
Vepa et al.

(10) Patent No.: US 11,398,900 B2
(45) Date of Patent: Jul. 26, 2022

(54) CLOUD BASED KEY MANAGEMENT

(71) Applicant: Oracle International Corporation, Redwood Shores, CA (US)

(72) Inventors: Sirish V. Vepa, Pune (IN); Prateek Mishra, Junction, NY (US); Sreedhar Katti, Karnataka (IN); Varanasi Kumar Ravi, Cupertino, CA (US); Harold William Lockhart, Newton, MA (US); Rakesh Keshava, Freemont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 223 days.

(21) Appl. No.: 16/269,736

(22) Filed: Feb. 7, 2019

(65) Prior Publication Data

US 2019/0394024 A1 Dec. 26, 2019

(30) Foreign Application Priority Data

Jun. 21, 2018 (IN) .............................. 201841023140

(51) Int. Cl.
*H04L 9/08* (2006.01)
(52) U.S. Cl.
CPC ............ *H04L 9/083* (2013.01); *H04L 9/0869* (2013.01)
(58) Field of Classification Search
None
See application file for complete search history.

(56) References Cited

U.S. PATENT DOCUMENTS

| 8,601,263 | B1 * | 12/2013 | Shankar ............... H04L 63/104 726/28 |
| 8,782,441 | B1 | 7/2014 | Osterwalder et al. |
| 8,914,632 | B1 | 12/2014 | Shankar et al. |
| 9,667,416 | B1 | 5/2017 | Machani et al. |
| 9,716,696 | B2 | 7/2017 | Narayan et al. |
| 9,887,836 | B1 | 2/2018 | Roth |
| 10,211,977 | B1 | 2/2019 | Roth et al. |
| 10,243,739 | B1 | 3/2019 | Brandwine et al. |
| 10,581,820 | B2 | 3/2020 | Keshava et al. |

(Continued)

FOREIGN PATENT DOCUMENTS

| EP | 3376387 A1 | 9/2018 |
| EP | 3376687 A1 | 9/2018 |

OTHER PUBLICATIONS

Jones, M., et al. "RFC 7516—JSON Web Encryption (JWE)" [online] IETF, May 2015 [retrieved Nov. 7, 2020], Retrieved from the Internet: URL: https://tools.ietf.org/html/rfc7516 (Year: 2015).*

(Continued)

*Primary Examiner* — Taghi T Arani
*Assistant Examiner* — Joshua Raymond White
(74) *Attorney, Agent, or Firm* — Potomac Law Group, PLLC

(57) ABSTRACT

Embodiments are directed to managing cryptographic keys in a multi-tenant cloud based system. Embodiments receive from a client a request for a wrapped data encryption key ("DEK"). Embodiments generate a random key and fetch encryption context that corresponds to the client. Embodiments generate the wrapped DEK including the random key and the encryption context encoded in the wrapped DEK. Embodiments then return the wrapped DEK to the client.

20 Claims, 4 Drawing Sheets

(56) References Cited

U.S. PATENT DOCUMENTS

| | | | |
|---|---|---|---|
| 10,623,186 B1* | 4/2020 | Mehr | H04L 9/3226 |
| 10,623,386 B1 | 4/2020 | Bernat et al. | |
| 10,693,638 B1 | 6/2020 | Cignetti et al. | |
| 10,747,529 B2 | 8/2020 | Yuki et al. | |
| 10,803,451 B2 | 10/2020 | Peikert et al. | |
| 10,922,132 B1 | 2/2021 | Shiramshetti et al. | |
| 10,979,403 B1* | 4/2021 | Mutescu | H04L 9/0631 |
| 11,075,753 B2 | 7/2021 | Angel | |
| 2012/0011360 A1 | 1/2012 | Engels et al. | |
| 2014/0019753 A1 | 1/2014 | Lowry et al. | |
| 2016/0112387 A1 | 4/2016 | Cignetti et al. | |
| 2016/0241389 A1* | 8/2016 | Le Saint | H04L 9/0844 |
| 2016/0337403 A1* | 11/2016 | Stoops | H04W 12/065 |
| 2018/0041503 A1* | 2/2018 | Lindemann | H04L 63/0435 |
| 2018/0316676 A1 | 11/2018 | Gilpin et al. | |
| 2018/0337914 A1 | 11/2018 | Abdul et al. | |
| 2019/0229899 A1* | 7/2019 | Roth | H04L 9/0897 |
| 2019/0318102 A1 | 10/2019 | Araya et al. | |
| 2019/0342079 A1 | 11/2019 | Rudzitis et al. | |

OTHER PUBLICATIONS

Pardon et al., "Consistent Disaster Recovery for Microservices: the BAC Theorem", IEEE Cloud Computing, IEEE, USA, vol. 5, No. 1, Jan. 1, 2018, pp. 49-59.

* cited by examiner

CLOUD BASED KEY MANAGEMENT

FIELD

One embodiment is directed generally to a cloud based computer system, and in particular to the management of cryptographic keys in a cloud based computer system.

BACKGROUND INFORMATION

A key management service ("KMS") provides for the management of cryptographic keys in a cryptosystem. Management includes the functions of the generation, exchange, storage, use, crypto-shredding (i.e., destruction) and replacement of keys. It includes cryptographic protocol design, key servers, user procedures, and other relevant protocols.

The keys in a KMS are logical entities that represent one or more key versions that contain the cryptographic material used to encrypt and decrypt data, protecting the data where it is stored. When processed as part of an encryption algorithm, a key specifies how to transform plaintext into ciphertext during encryption and how to transform ciphertext into plaintext during decryption. A KMS in general recognizes two types of encryption keys: a master encryption key ("MEK") and a data encryption key ("DEK"). After a user has created a master encryption key using the KMS, the user can then use an API to generate data encryption keys that the KMS returns to the user. A KMS returns a raw key and a wrapped key. Typically, the user will only store the wrapped key.

SUMMARY

Embodiments are directed to managing cryptographic keys in a multi-tenant cloud based system. Embodiments receive from a client a request for a wrapped data encryption key ("DEK"). Embodiments generate a random key and fetch encryption context that corresponds to the client. Embodiments generate the wrapped DEK including the random key and the encryption context encoded in the wrapped DEK. Embodiments then return the wrapped DEK to the client.

DETAILED DESCRIPTION

One embodiment generates a wrapped data encryption key ("DEK") by including custom tags and values that are encoded in a header of the wrapped DEK and that function as authoritative attributes. The tags and values are then used to enforce policy decisions when receiving requests to unwrap the wrapped DEK or otherwise authorizing access to the wrapped DEK.

As disclosed, a wrapped DEK is issued to a requestor (e.g., a user or an application) by a key management service ("KMS"). The wrapped DEK is later presented back to the KMS with the intent of unwrapping the wrapped DEK. The onus is upon the KMS to authorize the requestor. However, in a cloud environment, the number of users, applications and wrapped DEKs can be very high. A solution is needed to handle the authorization access by a KMS for wrapped DEKs that can number greater than one million in certain examples.

Figure 1:
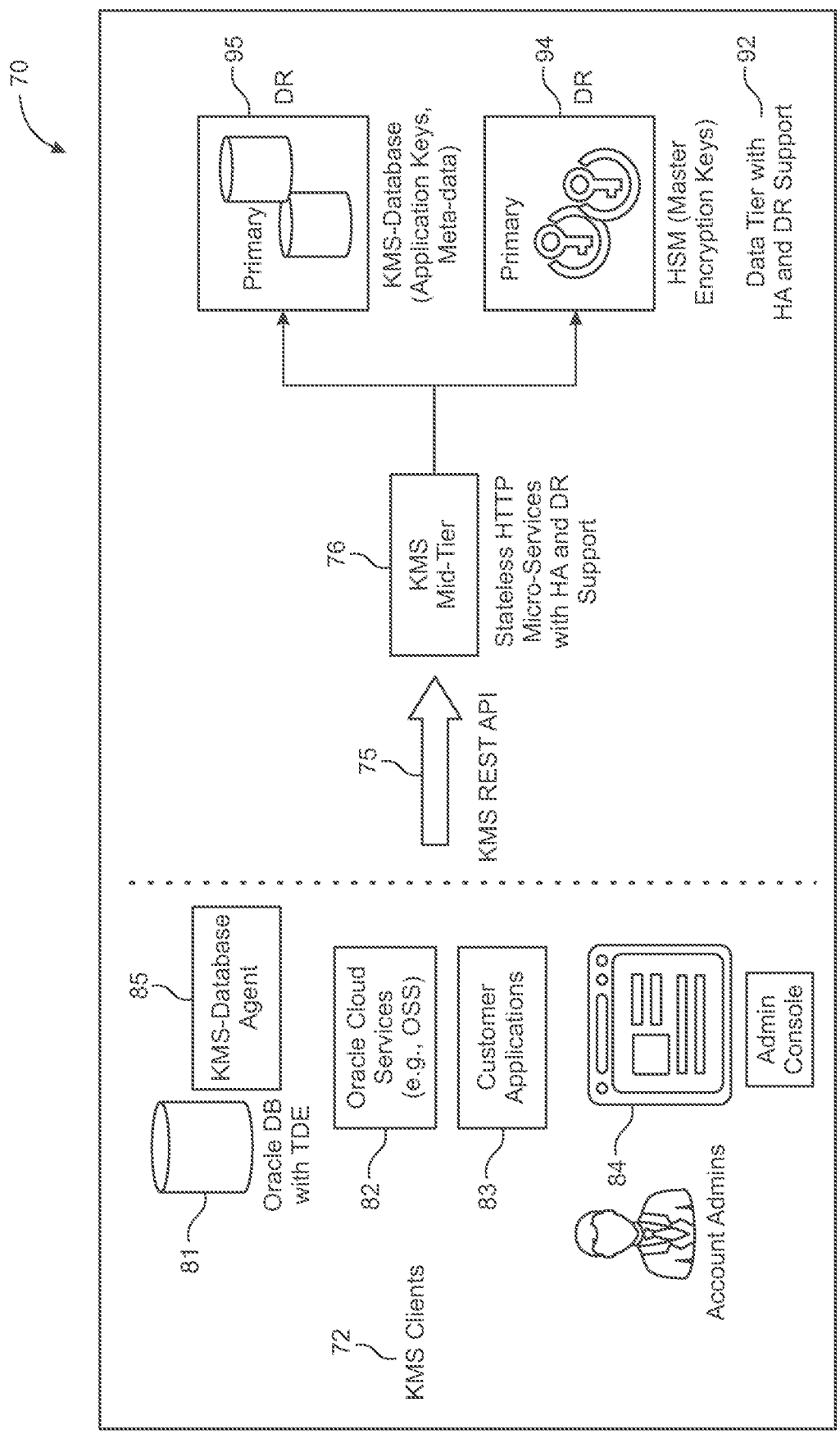
FIG. 1 illustrates a high level overview of a KMS in accordance to embodiments of the invention.

FIG. 1 illustrates a high level overview of a KMS 70 in accordance to embodiments of the invention. A plurality of KMS clients 72 request keys using a representational state transfer ("REST") application program interface ("API") from one or more web servers 76 (also referred to as "mid-tier component 76" and "mid-tier 76"). Clients 72 that can request and utilize keys include a database 81. In one embodiments, database 81 is a database from Oracle Corp. that includes Transparent Data Encryption ("TDE") that enables the encryption of sensitive data that is stored in tables and tablespaces. After the data is encrypted, this data is transparently decrypted for authorized users or applications when they access this data. In this embodiment, database 81 includes a KMS-DB agent 85. Other requesting clients 72 can include various cloud services 82 in a cloud environment, various customer applications 83, or an administrative console 84 that is operated by an account administrator.

In one embodiment, one or more web servers 76 are cloud based servers. In embodiments, web servers 76 are implemented by a mid-tier component 76 which exposes a REST API 75 based-upon system for cross-domain identity management ("SCIM"). In one embodiment, mid-tier 76 includes of a set of stateless microservices which communicate with a data tier 92.

In one embodiment, a microservice that can implement mid-tier 76 is an independently deployable service. In one embodiment, the term "microservice" contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an Hypertext Transfer Protocol ("HTTP") resource API). In one embodiment, microservices are easier to replace relative to a monolithic service that performs all or many of the same functions. Moreover, each of the microservices may be updated without adversely affecting the other microservices. In contrast, updates to one portion of a monolithic service may undesirably or unintentionally negatively affect the other portions of the monolithic service. In one embodiment, microservices may be beneficially organized around their capabilities. In one embodiment, the startup time for each of a collection of microservices is much less than the startup time for a single application that collectively performs all the services of those microservices. In some embodiments, the startup time for each of such microservices is about one second or less, while the startup time of such single application may be about a minute, several minutes, or longer.

In one embodiment, a microservices architecture such as mid-tier 76 refers to a specialization (i.e., separation of tasks within a system) and implementation approach for service oriented architectures ("SOAs") to build flexible, independently deployable software systems. Services in a microservices architecture are processes that communicate with each other over a network in order to fulfill a goal. In one embodiment, these services use technology-agnostic protocols. In one embodiment, the services have a small granularity and use lightweight protocols. In one embodiment, the services are independently deployable. By distributing functionalities of a system into different small services, the cohesion of the system is enhanced and the coupling of the system is decreased. This makes it easier to change the system and add functions and qualities to the system at any time. It also allows the architecture of an individual service to emerge through continuous refactoring, and hence reduces the need for a big up-front design and allows for releasing software early and continuously.

In one embodiment, in the microservices architecture, an application is developed as a collection of services, and each service runs a respective process and uses a lightweight protocol to communicate (e.g., a unique API for each microservice). In the microservices architecture, decomposition of a software into individual services/capabilities can be performed at different levels of granularity depending on the service to be provided. A service is a runtime component/process. Each microservice is a self-contained module that can talk to other modules/microservices. Each microservice has an unnamed universal port that can be contacted by others. In one embodiment, the unnamed universal port of a microservice is a standard communication channel that the microservice exposes by convention (e.g., as a conventional HTTP port) and that allows any other module/microservice within the same service to talk to it. A microservice or any other self-contained functional module can be generically referred to as a "service".

Data tier 92 includes hardware security modules ("HSMs") 94 and databases 95. An HSM is a physical computing device that safeguards and manages digital keys for strong authentication and provides crypto processing. These modules traditionally come in the form of a plug-in card or an external device that attaches directly to a computer or network server. MEKs are resident within HSMs 94 and HSMs 94 provide crypto-services that involve MEKs. Application keys and all metadata are stored within database 95. All components of mid-tier 76 and data tier 92 are implemented with high availability ("HA") and disaster recovery ("DR") in some embodiments.

In one embodiment, mid-tier 76 and data tier 92 are implemented by authentication services that are provided by an Identity Cloud Service ("IDCS") that is a multi-tenant, cloud-scale, identity access management ("IAM") platform from Oracle Corp. IDCS provides authentication, authorization, auditing and federation. IDCS manages access to custom applications and services running on the public cloud, and on-premise systems. In an alternative or additional embodiment, IDCS may also manage access to public cloud services. For example, IDCS can be used to provide Single Sign On ("SSO") functionality across a variety of services/applications/systems. Users and clients must first authenticate to IDCS and obtain tokens that are suitable for KMS access. Perimeter authorization is enforced by IDCS Cloud Gate. Fine-grained access to KMS APIs is enforced by an authorization module with appropriate scopes and roles used to distinguish between clients and administrators. Additional details of IDCS are disclosed in U.S. Pat. No. 9,838,376, the disclosure of which is hereby incorporated by reference.

Figure 2:
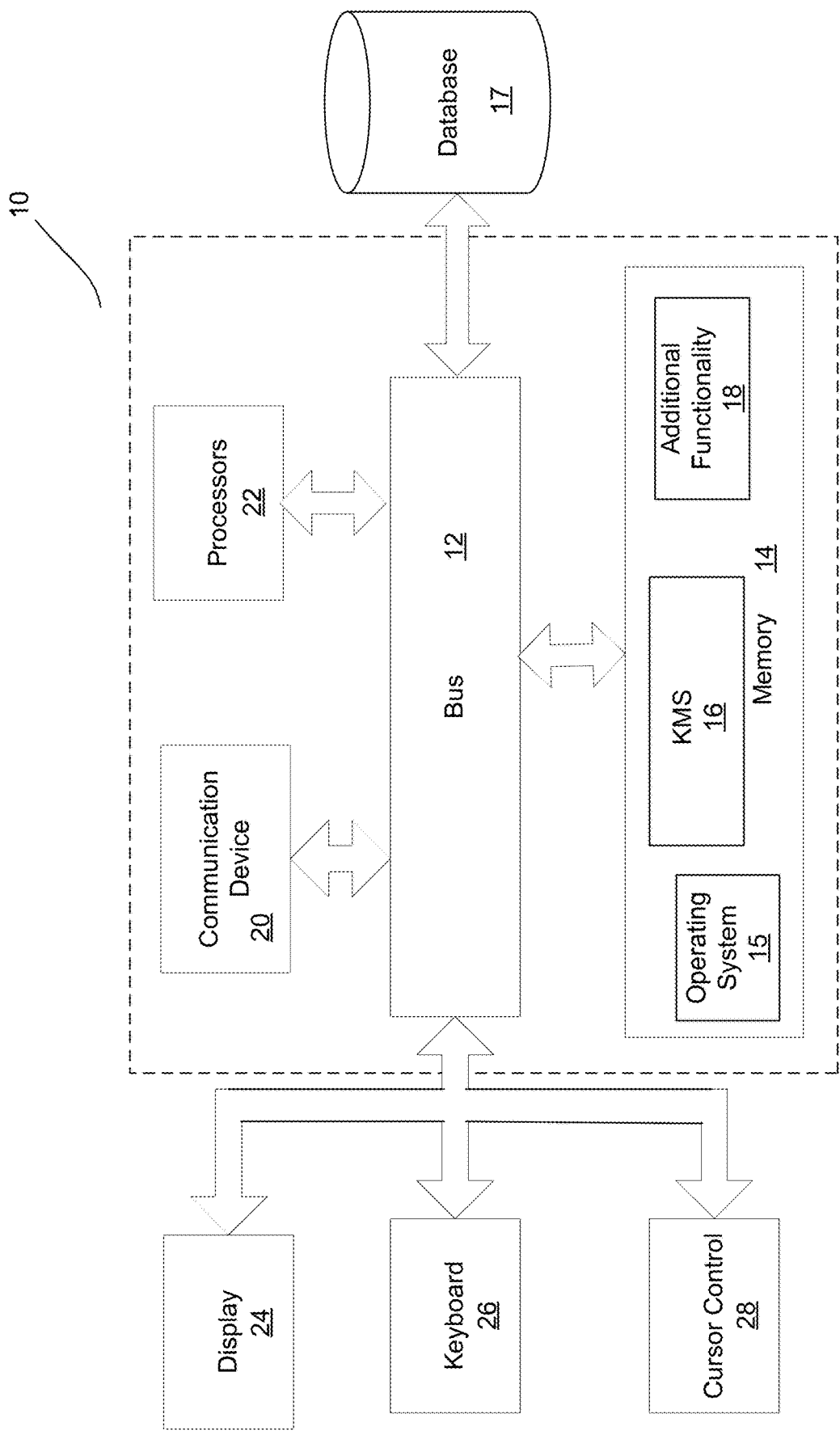
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 2, such as a keyboard or display. All or portions of system 10 may be used to implement any or all of the components shown in FIG. 1 in some embodiments.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a KMS module 16 that provides KMS functionality, and all other functionality disclosed herein. System 10 can be part of a larger system. Therefore, system 10 can include one or more additional functional modules 18 to include the additional functionality, such as IDCS functionality disclosed above. A database 17 is coupled to bus 12 to provide centralized storage for modules 16 and 18 and store keys, passwords, etc. In one embodiment, database 17 is a relational database management system ("RDBMS") that can use Structured Query Language ("SQL") to manage the stored data.

In connection with unwrapping a wrapped DEK, known KMS solutions apply authentication and authorization on user supplied attributes, known as additional authenticated data ("AAD"). AAD is a feature of authentication encryption modes, such as Galois/Counter Mode ("GCM"). In GCM, all data that is encrypted is also integrity protected (i.e., authenticated). Other data to be integrity protected (i.e., authenticated) but not encrypted is referred to as AAD.

However, in the known solutions, the user supplied attributes are generally received from an external source and must be supplied explicitly by the requestor. For example, with the "AWS KMS" from Amazon Corp., a wrapped data format is used and the unwrapping can include the consideration of the AAD, which is an encoding of the encryption context, and is not present in the wrapped data format. The optional AAD has to be supplied (i.e., operator controlled) as a parameter to the REST API along with the wrapped DEK in the unwrapping process.

Similarly, with the "Cloud KMS" from Google Corp., a user is instructed that if additional authenticated data is used when the file is encrypted, the same additional authenticated data must be specified when the ciphertext is decrypted (i.e., not provided with the wrapped key itself).

In contrast to known solutions, embodiments improve the efficacy of the wrapped DEK authorization request by optimizing data encryption key access using authoritative attributes available implicitly in the wrapped data encryption key. Specifically, in embodiments, the wrapped DEKs are represented by a standard JavaScript Object Notation ("JSON") Web Encryption ("JWE") structure, disclosed for example at https://tools.ietf.org/html/rfc7516. Embodiments encode custom attributes in the wrapped/encrypted format. Further, custom tags and values are set in the JWE protected header of the wrapped DEK. In addition to utilizing user and group information to enforce access to the wrapped DEK, the tags and values encoded in the wrapped DEK are also used. The requestor need not supply the tags explicitly. Instead, the tags are implicitly obtained from the wrapped DEK. The tags are used to enforce further authorization upon the wrapped DEK.

When the wrapped DEK is constructed by embodiments of the KMS, the necessary tag/values are encoded in the wrapped DEK. Therefore, the tag/values set can be deemed to be set by a trusted authority.

Tags set by embodiments of the KMS can be used to enforce policy decisions such as:
 A DEK manufactured (or requested) for a given customer/tenancy cannot be unwrapped by a different customer/tenancy in a cloud based environment such as IDCS.
 An application or an administrator of a given data center can manage wrapped data encryption provided they were created in the same data center.
 A wrapped DEK should only be unwrapped in the same legal jurisdiction to ensure and preserve the sanctity of data sovereignty, residency and localization rules many governments across the world are beginning to enforce.

In embodiments, policy decisions are enforced by embedding a tag/value in the wrapped DEK representing the desired policy objective. A policy identifier or a hint may additionally be embedded in the wrapped DEK as a tag/value.

At runtime, for the authorization decision, embodiments fetch the tag information from the wrapped DEK and compare against the tag information belonging to the user, such as where the user is logging in from, or the group or administrator privileges the user possesses. If there is a sufficient match, the authorization decision is a success and the unwrapping is permitted.

The embedding and implicit fetching of the tags for the purpose of authorizing access to the wrapped DEK is a technical improvement over existing solutions.

In embodiments, the wrapped DEK is returned to the client/user as a response while creating a DEK using the REST API/admin/v1/DataEncryptionKeyGenerator. While the unwrapping of the DEK is performed by HSM 94 (where the MEK resides), the format of the wrapped DEK is defined by embodiments of the KMS.

In addition to Role Based Access Control ("RBAC"), and utilizing attributes as described above, fine grained access using embodiments leverage the tags (and values) implicitly embedded in the wrapped DEK.

In embodiments, the following additional tags may be embedded in the wrapped DEK that is generated:
"urn:opc:kms:regionID": "uscom-central-1",
"urn:opc:kmslocationID": "uscom",
"urn:opc:kms:siID":
"FF91E56E58F34C58A806A86137966627", "SIID" refers to the Service Instance Identifier, which identifies a tenant (i.e., a stripe or a splice) in a multi-tenant key management cloud solution such as IDCS. If the presented (from the wrapped DEK input payload) SIID is different from the current execution context (i.e., where the request was directed at) SIID, then that the wrapped DEK is presented in the wrong customer tenancy. Hence the request will be denied.

IDCS and the Oracle Public Cloud, is hosted in regions and availability domains. A region is a localized geographic area, and an availability domain is one or more data centers located within a region. A region is composed of several availability domains. Most resources are either region-specific, such as a virtual cloud network, or availability domain-specific, such as a compute instance.

The "region Id" embedded in the wrapped key corresponds to the region. The location is an aggregation of the region. Data jurisdiction may or may not coincide with regions and location. However, external policy mappings may be devised to derive the data jurisdiction from the region. Thus, in some embodiments it is important to track where the key was manufactured, and from where it is being requested/accessed.

In embodiments, the actual attributes (and their values) are not of real concern. As described below, the validation of the tags occurs before the unwrap of the wrapped DEK, and therefore, this is an optimization.

Embodiments improve on known solutions to optimize the authorization decision evaluation of whether the requester is authorized to unwrap a wrapped DEK or not by leveraging attributes embedded in the wrapped DEK that could contribute to the authorization decision. There is no additional step required to fetch these resource attributes (i.e., attributes from the wrapped DEK) as it is already present in the resource. This is an optimization in itself. Further, unwrapping of the wrapped DEK is a crypto intensive operation performed by the HSM. By validating the tags prior to the unwrap, embodiments can determine if the customer has incorrectly presented the wrapped DEK to the KMS instance. This is a further optimization.

Embodiments use JWE to represent the wrapped DEK to provide an open and interoperable DEK representation formation for the KMS. Arbitrary tags/values may be encoded in the JWE. The tag can be used to identify a wrapped DEK. In addition, the embedded tags/values are used to enforce access control on operations on the wrapped DEK. Embodiments implicitly derive authorization information from the wrapped DEK (from the embedded tags) to enforce access upon the wrapped DEK.

The wrapped DEK is a self-describing enveloped data structure that has a reference to the MEK (kid in the protected header) that was used to encrypt the DEK along with the encryption (wrapping algorithm) A256GCM. The structure is a JSON Web Encryption ("JWE") structure. The format of the wrapped and unwrapped (RawKey) DataEncryptionKey is as follows in embodiments:

| Payload | Sample Key (in Hexa String) |
|---|---|
| Wrapped DEK in JSON Web Key in String format - BASE64URL(UTF8(JWE Protected Header)).* ‖ '.' ‖ BASE64URL(JWE Encrypted Key) ‖ '.' ‖ BASE64URL(JWE Initialization Vector) ‖ '.' ‖ BASE64URL(JWE Authentication Tag) | eyJ1cm46b3BjOmttczpyZWdpb25JRCl6IIRFTVBfUkVHSU9O X1ZBTFVFLXVzY29tLWNlbnRyYWwtMSlslnVybjpvcGM6a21z OnZlcnNpb24iOiJ2MSlslmtpZCl6ljc4YjM0YTU5YjlyODQ3ZjR hYjljYmQ3ZWY5OTFkMmUyliwidXJuOm9wYzprbXM6bG9jYX Rpb25JRCl6IIRFTVBfU0VSVklDRV9Mb2NhdGlvbklEX1ZBTF VFliwidXJuOm9wYzprbXM6c2lJRCl6lmttc3NlcnZpY2UxliwiZ W5jljoiQTl1NkdDTSlslmFsZyl6lkEyNTZLVyJ9.j2elsiyH9x-- te65qDf7rMRyFikByAf34qFdcbtEm9E.TX2w8LK__m25TnfhR.td JMiaE55JX6dTilXuiMRg |
| JWK Format | After Performing Base64URL Decode on the various components<br>Protected header<br>{<br>    "urn:opc:kms:regionID": "TEMP_REGION_VALUE-uscom-central-1",<br>    "urn:opc:kms:version": "v1",<br>    "kid": "78b34a59b22847f4ab9cbd7ef991d2e2",<br>    "urn:opc:kms:locationID": "TEMP_SERVICE_LocationID_VALUE",<br>    "urn:opc:kms:siID": "kmsservice1",<br>    "enc": "A256GCM",<br>    "alg": "A256KW"<br>}<br>Base64 URL Encoded Value of the encrypted key (43 bytes)<br>j2elsiyH9x--te65qDf7rMRyFikByAf34qFdcbtEm9E<br>Therefore, after Base64 URL Decoding, it is the<br>Encrypted DEK in Hex Format<br>8f 67 a5 b2 2c 87 f7 1f<br>be b5 ee b9 a8 37 fb ac<br>c4 72 16 29 01 c8 07 f7<br>e2 a1 5d 71 bb 44 9b d1<br>base64 URL Decoded of the IV<br>TX2w8LK__m25TnfhR<br>12 bytes after base64url decoding<br>4d 7d b0 f0 b2 bf 9b 6e<br>53 9d f8 51<br>Authentication Tag<br>tdJMiaE55JX6dTilXuiMRg<br>16 bytes after base64url decoding<br>b5 d2 4c 89 a1 39 e4 95<br>fa 75 38 88 5e e8 8c 46 |
| Raw DEK | dek": {<br>    "k":<br>"V2_yLbpWSa_6zRR6ylMAsWeeTy6D2bFjb4rY8lCgt5k",<br>    "alg": "A256KW",<br>    "kty": "oct"<br>} |

Figure 3:
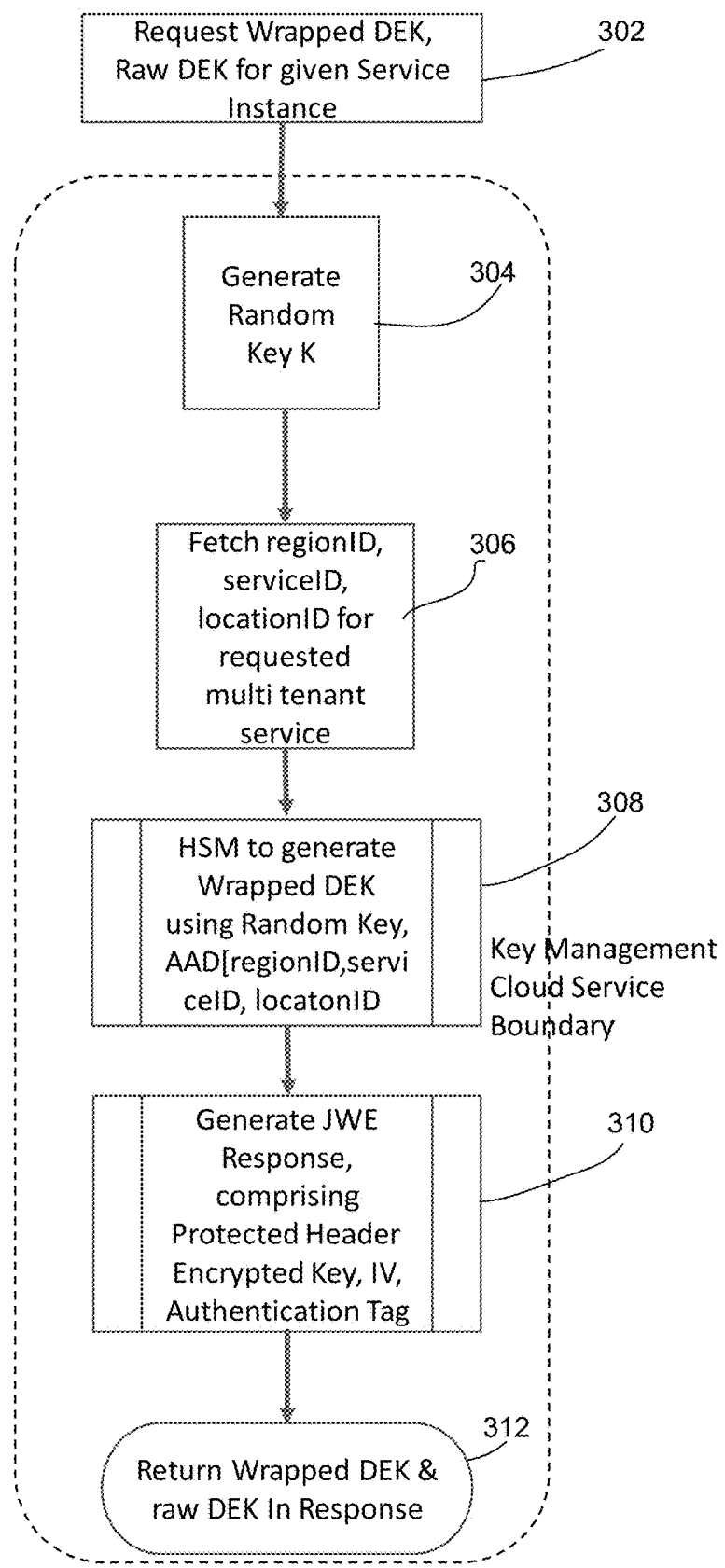
FIG. 3 is a flow diagram of functionality for generating a wrapped DEK by a KMS in accordance with an embodiment.

FIG. 3 is a flow diagram of functionality for generating a wrapped DEK by a KMS in accordance with an embodiment. In embodiments, the functionality of FIG. 3 is implemented by KMS module 16 of FIG. 2 or by mid-tier 76 and data tier 92 of FIG. 1. In one embodiment, the functionality of the flow diagram of FIG. 3 (and FIG. 4 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, a request is received from a client for a wrapped DEK and a raw DEK for a given service instance (in a multi-tenant embodiment) is received. The raw DEK in general is an unwrapped key with no metadata or any other information attached to it. In embodiments, the request is received via a REST API. In embodiments, the client is part of a multi-tenant service such as IDCS or another type of cloud service At 304, a random key "K" is generated.

At 306, the AAD information (or more generally, "encryption context") that includes the regionID (in embodiments with multiple geographic regions), the serviceID and the location ID are fetched. The location ID indicates the location from which the client is making the request in embodiments.

At 308, the wrapped DEK is generated using the random key from 304 and the AAD information from 306.

At 310, the JWE response is generated which includes a protected header, an encrypted key, an Initialization Vector ("IV") and an authentication TAG. IV is a random, unpredictable value, which is not secret and is used at the start of each encryption. The authentication TAG in an authenticated encryption mode (e.g., GCM) is a value that serves as a checksum to determine if the data has been altered in any way. The transmitted and computed tags must be the same if the data has not been modified. The TAG protects both the encrypted data and the AAD.

At 312, the wrapped DEK and raw DEK are returned to the client in a response.

Figure 4:
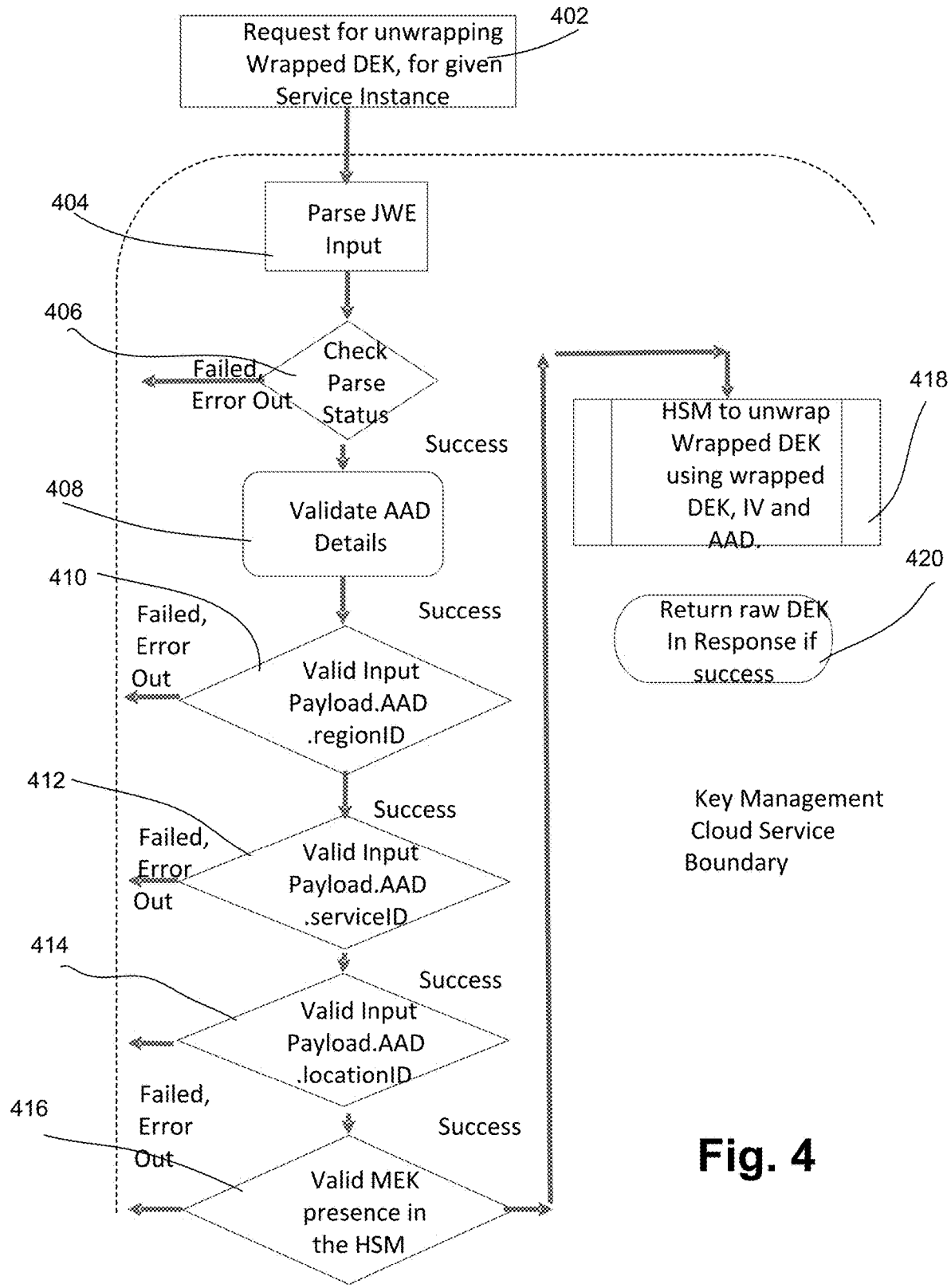
FIG. 4 is a flow diagram of functionality for unwrapping a wrapped DEK by a KMS in accordance with an embodiment.

FIG. 4 is a flow diagram of functionality for unwrapping a wrapped DEK by a KMS in accordance with an embodiment. In embodiments, the functionality of FIG. 4 is implemented by KMS module 16 of FIG. 2 or by mid-tier 76 and data tier 92 of FIG. 1.

At 402, a request is received for unwrapping a wrapped DEK, for a given service instance (in multi-tenant embodiments). In embodiments, the request is received via a REST API and the wrapped DEK is in the form of a JWE.

At 404, the wrapped DEK, in the form of the JWE, is parsed.

At 406, if the parse status failed, the functionality ends and an error message is output. A parse status fails if there has been a syntax error in the input.

At 408, the AAD details are validated in the functionality below starting at 410. Values such as regionID, serviceID and locationID are validated in embodiments by determining if they appear on the list of defined regions, services or locations, which is administratively assigned when a customer partition in set up in the cloud based system.

At 410, the regionID is validated. If not valid, the functionality ends and an error message is output.

At 412, the serviceID is validated. If not valid, the functionality ends and an error message is output.

At 414, the location ID is validated. If not valid, the functionality ends and an error message is output.

At 416, the MEK presence in the HSM is validated. If not valid, the functionality ends and an error message is output.

At 418, the HSM unwraps the wrapped DEK using the wrapped DEK, IV and AAD. Therefore, all of the validation in embodiments occurs before the wrapped DEK is unwrapped (i.e., the wrapped key is decrypted).

At 420, the unwrapped raw key is returned to the client.

Although embodiments uses values of region ID, serviceID and location ID in the AAD, as disclosed above, any other tags/values/parameters can be used that can be helpful in validating a request. A wrapped key will have the appropriate values stored in the AAD field when it is created. These values are not a secret, but because they are in the AAD, their values cannot be modified without detection. When the key is about to be unwrapped and used, the "correct" values will be determined from the configuration data and compared to the values stored in the AAD. If they do not match the key will not be made available.

Different policies can determine what items must be present and what they must match. This is primarily to detect configuration errors, since anyone in possession of the wrapped key will be able to read the AAD field. However, if the API controls what checks are performed and where the configured values are taken from, this could serve as a security measure, preventing a key from being used in an incorrect context.

As disclosed, embodiments generated a wrapped DEK key that has AAD embedded in the key header. The embedded AAD is then used for validation by the KMS when a request is received to unwrap the wrapped DEK. Therefore, external AAD is not needed.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of managing cryptographic keys in a multi-tenant cloud based system, the method comprising:
receiving from a client a wrapping request for a wrapped data encryption key (DEK); generating a random key;
fetching additional authentication data (AAD) that corresponds to the client, the AAD comprising a first location of the client and a first tenancy of the multi-tenant cloud based system;
generating the wrapped DEK comprising the random key and the AAD encoded in the wrapped DEK, wherein the wrapped DEK comprises a header and the AAD is encoded in the header; and
returning the wrapped DEK to the client;
receiving a unwrapping request from the client to unwrap the wrapped DEK, the unwrapping request comprising a second location from which the client is making the unwrapping request and is directed to a second tenancy of the multi-tenant cloud based system;
before unwrapping the DEK, using the encoded AAD in the header to compare the first location to the second location and compare the first tenancy to the second tenancy to determine whether the client is authorized to unwrap the wrapped DEK; and
unwrapping the DEK when the first location matches the second location and the first tenancy matches the second tenancy.

2. The method of claim 1, further comprising embedding tags in the wrapped DEK, the tags used for enforcing policy decisions in response to the unwrapping request to unwrap.

3. The method of claim 1, wherein the wrapped DEK comprises a JavaScript Object Notation (JSON) Web Encryption (JWE) structure.

4. The method of claim 1, further comprising:
receiving the unwrapping request to unwrap the wrapped DEK; parsing the wrapped DEK;
validating the encoded AAD;
validating a master encryption key (MEK) presence in a hardware security module (HSM); and
returning an unwrapped DEK.

5. The method of claim 1, the generating the wrapped DEK further comprising an Initialization Vector (IV) and an authentication TAG key.

6. The method of claim 1, wherein the unwrapping request comprises a representational state transfer (REST) application program interface (API).

7. The method of claim 2, the tags comprising a service instance identifier.

8. A non-transitory computer readable medium having instructions stored thereon that, when executed by a processor, cause the processor to manage cryptographic keys in a multi-tenant cloud based system, the managing comprising:
receiving from a client a wrapping request for a wrapped data encryption key (DEK);
generating a random key;
fetching additional authentication data (AAD) that corresponds to the client, the AAD comprising a first location of the client and a first tenancy of the multi-tenant cloud based system;
generating the wrapped DEK comprising the random key and the AAD encoded in the wrapped DEK, wherein the wrapped DEK comprises a header and the AAD is encoded in the header; and
returning the wrapped DEK to the client;
receiving a unwrapping request from the client to unwrap the wrapped DEK, the unwrapping request comprising a second location from which the client is making the unwrapping request and is directed to a second tenancy of the multi-tenant cloud based system;

before unwrapping the DEK, using the encoded AAD in the header to compare the first location to the second location and compare the first tenancy to the second tenancy to determine whether the client is authorized to unwrap the wrapped DEK; and unwrapping the DEK when the first location matches the second location and the first tenancy matches the second tenancy.

9. The computer readable medium of claim 8, further comprising embedding tags in the wrapped DEK, the tags used for enforcing policy decisions in response to the unwrapping request to unwrap.

10. The computer readable medium of claim 8, wherein the wrapped DEK comprises a JavaScript Object Notation (JSON) Web Encryption (JWE) structure.

11. The computer readable medium of claim 8, the managing further comprising:
receiving the unwrapping request to unwrap the wrapped DEK;
parsing the wrapped DEK; validating the encoded AAD;
validating a master encryption key (MEK) presence in a hardware security module (HSM); and returning an unwrapped DEK.

12. The computer readable medium of claim 8, the generating the wrapped DEK further comprising an Initialization Vector (IV) and an authentication TAG key.

13. The computer readable medium of claim 8, wherein the unwrapping request comprises a representational state transfer (REST) application program interface (API).

14. The computer readable medium of claim 9, the tags comprising a service instance identifier.

15. A multi-tenant cloud based key management system comprising:
a mid-tier comprising one or more microservices, each of the one or more microservices comprising a hardware processor executing instructions; and
a data tier coupled to the mid-tier and comprising one or more databases and one or more hardware security modules;
the one or more microservices:
receiving from a client a wrapping request for a wrapped data encryption key (DEK);
generating a random key;
fetching additional authentication data (AAD) that corresponds to the client, the AAD comprising a first location of the client and a first tenancy of the multi-tenant cloud based system;
generating the wrapped DEK comprising the random key and the AAD encoded in the wrapped DEK, wherein the wrapped DEK comprises a header and the AAD is encoded in the header; and
returning the wrapped DEK to the client;
receiving a unwrapping request from the client to unwrap the wrapped DEK, the unwrapping request comprising a second location from which the client is making the unwrapping request and is directed to a second tenancy of the multi-tenant cloud based system;
before unwrapping the DEK, using the encoded AAD in the header to compare the first location to the second location and compare the first tenancy to the second tenancy to determine whether the client is authorized to unwrap the wrapped DEK; and
unwrapping the DEK when the first location matches the second location and the first tenancy matches the second tenancy.

16. The multi-tenant cloud based key management system of claim 15, wherein the wrapped DEK comprises a JavaScript Object Notation (JSON) Web Encryption (JWE) structure.

17. The multi-tenant cloud based key management system of claim 15, the one or more microservices further:
receiving the unwrapping request to unwrap the wrapped DEK;
parsing the wrapped DEK;
validating the encoded AAD;
validating a master encryption key (MEK) presence in a hardware security module (HSM); and
returning an unwrapped DEK.

18. The multi-tenant cloud based key management system of claim 5, the generating the wrapped DEK further comprising an Initialization Vector (IV) and an authentication TAG key.

19. The multi-tenant cloud based key management system of claim 15, wherein the unwrapping request comprises a representational state transfer (REST) application program interface (API).

20. The multi-tenant cloud based key management system of claim 15, the one or more microservices further comprising embedding tags in the wrapped DEK, the tags used for enforcing policy decisions in response to the unwrapping request to unwrap.

* * * * *

UNITED STATES PATENT AND TRADEMARK OFFICE
CERTIFICATE OF CORRECTION

PATENT NO. : 11,398,900 B2
APPLICATION NO. : 16/269736
DATED : July 26, 2022
INVENTOR(S) : Vepa et al.

It is certified that error appears in the above-identified patent and that said Letters Patent is hereby corrected as shown below:

On the Title Page

Column 1, under Inventors, Line 6, delete "Freemont," and insert -- Fremont, --, therefor.

In the Drawings

On sheet 3 of 4, in Fig. 3, under Reference Numeral 308, Line 5, delete "locatonID" and insert -- locationID --, therefor.

In the Specification

In Column 6, Line 8, delete ""FF91E56E58F34C58" and insert -- "FF91E56E58F34CB8 --, therefor.

In the Claims

In Column 12, Line 34, in Claim 18, delete "claim 5," and insert -- claim 15, --, therefor.

Signed and Sealed this
Twenty-sixth Day of December, 2023

Katherine Kelly Vidal
*Director of the United States Patent and Trademark Office*